United States Patent [19]

Tigner

[11] 4,023,750
[45] May 17, 1977

[54] ADAPTER MECHANISM FOR QUICK FOLD-UP OF HANG GLIDER FRAMES

[76] Inventor: James C. Tigner, 11330 E. Riverside Drive, No. 9, Bothell, Wash. 98011

[22] Filed: Aug. 11, 1976

[21] Appl. No.: 714,352

[52] U.S. Cl. .............................. 244/16; 244/DIG. 1
[51] Int. Cl.² ....................................... B64C 31/02
[58] Field of Search ............ 244/16, DIG. 1, 138 R, 244/153 R, 155 R; 46/79, 80

[56] References Cited
UNITED STATES PATENTS 3,936,012  2/1976  Murray ................................ 244/16

Primary Examiner—Trygve M. Blix
Assistant Examiner—Barry L. Kelmachter

[57] ABSTRACT

Frame adapter or camel for hang gliders having a fixed body portion for being secured to the hang glider frame keel and a pivotal clamping section attached to the fixed member. A connector support for the cross tubes and a support bar for the control bar are securely and detachably held between the stationary and clamping body members so that by releasing one king post cable, and the removal of one pin in the camel and one pin in the control bar, the entire hang glider can be folded up for transport or unfolded to be readied for flight. A guide cable is provided for the cross tube connector.

7 Claims, 5 Drawing Figures

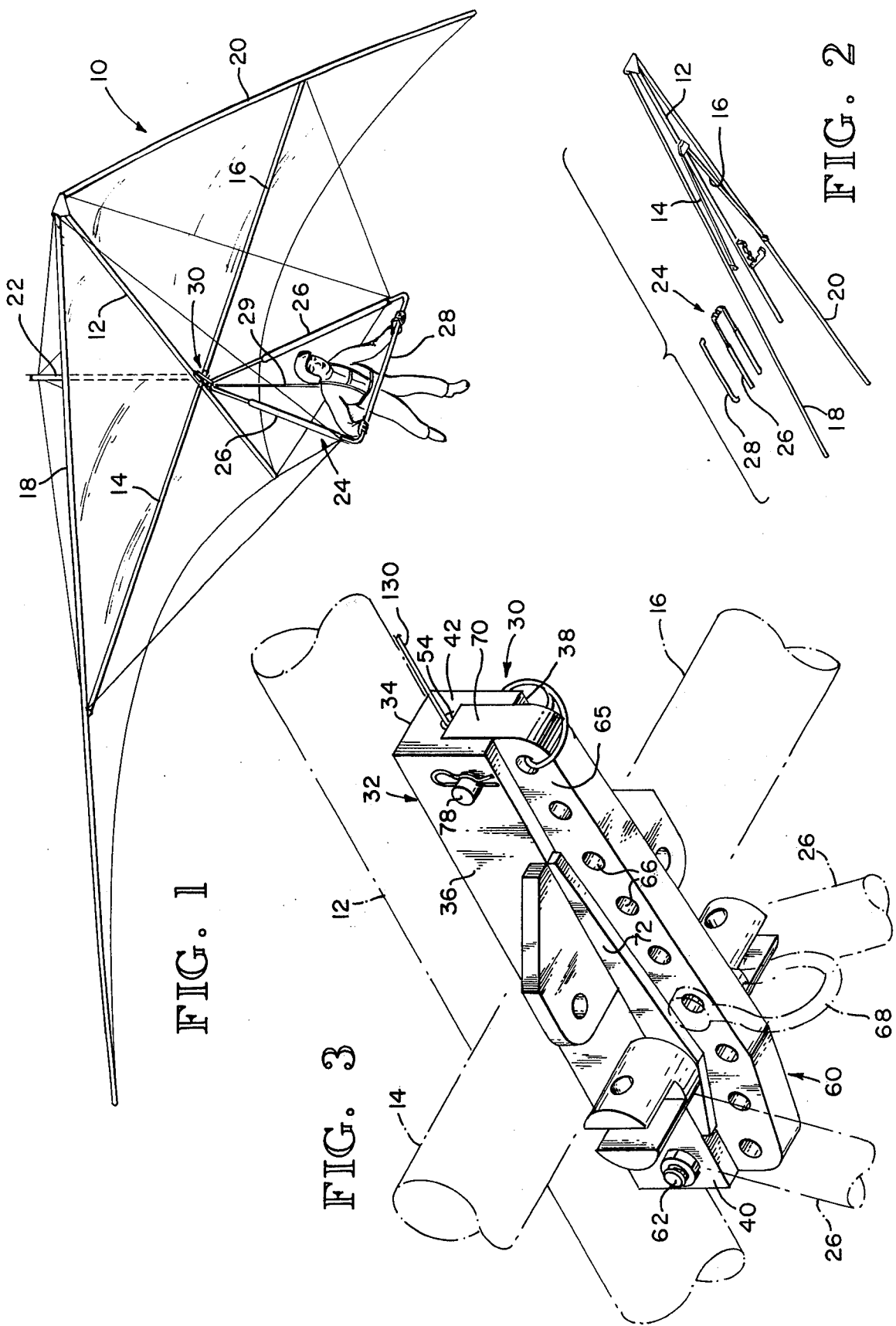

ADAPTER MECHANISM FOR QUICK FOLD-UP OF HANG GLIDER FRAMES

BACKGROUND OF THE INVENTION

The invention relates generally to the field of hang glider construction and more particularly to an adapter mechanism or camel to permit rapid fold-up and unfolding of a hang glider frame.

As those skilled in the art are aware, particularly hang glider flyers, considerable effort and time is involved in unfolding and preparing the hang glider for flight. Parts must be bolted together and cables tensioned after the glider has been transported to its take-off location. In like manner after flight the process must be reversed so that it may be transported. The current state of the art is such that parts have to be detached and the sail cloth rolled and cables coiled so that as much as half an hour may be involved in preparing the glider at or near the take-off site. Another half hour may be needed at the landing location for dismantling and folding the unit so that it can be transported back to the take-off area. Each piece of framework or cable which has to be disconnected or adjusted represents a point of human oversight or error and therefore a potential point of failure when the glider is in flight. Accordingly, the need has been recognized for rapidly folding up and unfolding a hang glider unit in such a way that the absolute minimum number of glider structure has to be touched.

SUMMARY OF THE INVENTION

The invention comprises a quick fold-up and unfold frame adapter or camel for the frame of a hang glider. The unit attaches to the keel of the frame and is comprised of a stationary or fixed member to which is attached a pivotal or clamping member. A support piece for the control bar and a connector member for the cross tubes are received between the fixed and pivotal members in their operatively closed position. A guide cable extends from the fixed member where it is anchored, through a bushing in the connector which slides along the cable toward the forward end of the keel. The pivotal member pivots about the rear portion of the fixed member and is detachably locked at the front end. The pivotal member is designed to place the guide cable under tension when it is in its locked and operative position. The pivotal member includes a series of spaced apart holes for receiving a shackle member which in turn supports a rapid link for the flyer's harness. The support piece for the control bar receives down tubes of the control bar so that the cross bar can be easily removed. Likewise the connector for the cross tubes pivotally receives the inner end of the two pieces of cross tube so that it may readily slide forward while the leading edges and cross tubes are folded rearwardly.

Accordingly, it is among the many features, advantages and objects of this invention to provide a frame adapter mechanism or camel for rapid fold-up and unfolding of a hang glider. A hang glider provided with this adapter enables the hang glider to be folded down by the removal of two pins, that is, the lock pin between the fixed and clamping adapter members and one pin for the cross bar. The mechanism eliminates cable adjustments, wing nuts and stripped threads. It enables the symmetrical distribution of load and enables quick unfolding and folding up of the glider. Where suitable it uses aircraft bolts and pins. The device is safe, reliable, relatively inexpensive and strong.

BRIEF DESCRIPTION OF DRAWINGS

FIG. 1 is an environmental view showing generally the appearance of a hang glider in flight;

FIG. 2 shows the frame of a hang glider as it might appear in its folded-up condition when employing the instant invention;

FIG. 3 is a perspective view showing the adapter mechanism with the two primary components locked together in operative relationship;

DESCRIPTION OF PREFERRED EMBODIMENT

Figure 4:
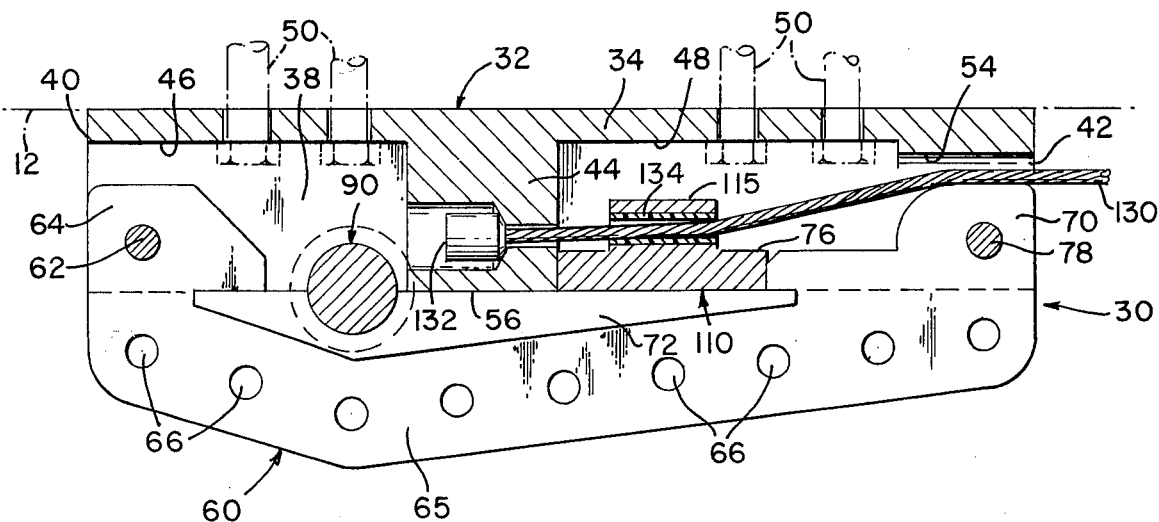
FIG. 4 is a cross-sectional view primarily of the fixed adapter member showing further details of the construction and FIG. 5 is a view in perspective showing the frame adapter open and in its inoperative mode and further illustrating details with respect to the cross-bar support piece and the cross-tube connector member.

FIG. 1 shows hang glider 10 which includes keel 12, cross tubes 14 and 16, leading edges 18 and 20, king post 22 and a frame adapter or camel generally designated by the number 30. The control bar is generally designated by the number 24 and has down tubes 26 and cross bar 28. A harness 29 which attaches to a shackle on the camel supports the hang glider flyer.

Figure 5:
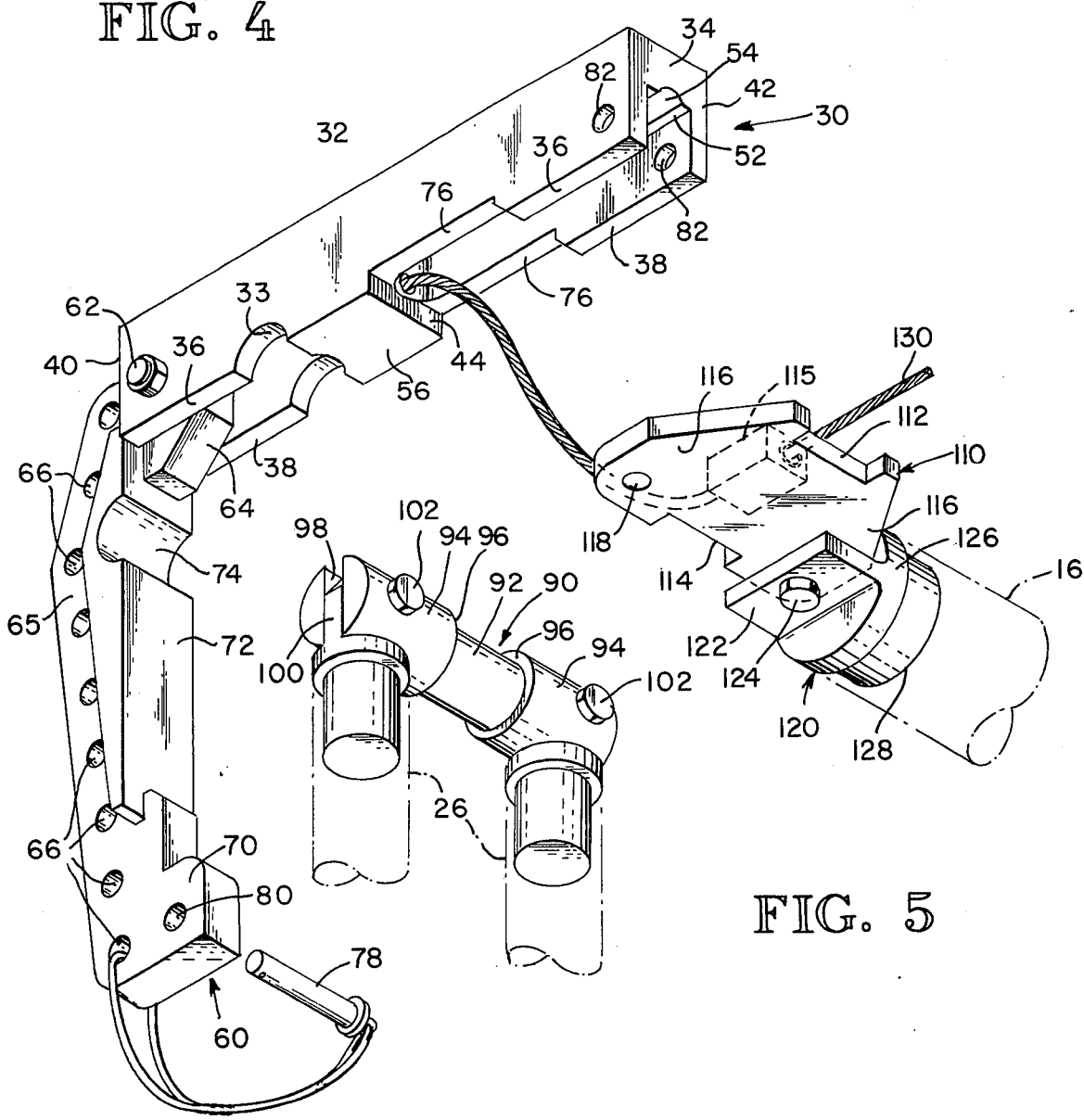

The hang glider frame adapter mechanism, which will hereinafter for brevity be referred to as the "camel" comprises an elongated fixed member generally designated by the number 32. Essentially it is a channel-like member having a base portion 34 and depending side walls 36 and 38. The camel unit has a rear end 40 and a forward end 42. Slightly rearwardly of the front to back dimension is a solid raised portion or guide-cable anchoring section 44 which extends downwardly from base 34 as shown best in FIGS. 4 and 5. Rearward of the anchoring portion 44 is the interior channel surface 46 which extends to the rear end 40. In like manner from the forward part of anchoring section 44 is a forward channel 48 which is roughly planar with rear interior channel surface 46. It will be noted that keel attachment bolts 50 are provided in channel areas 46 and 48 to secure the fixed member 32 to keel 12. The forward-most portion of the base wall 34 is raised as can be seen in FIGS. 3–5 to an offset surface 52 which in turn is provided with an elongated concave guide cable passage 54, the function of which will be explained more fully hereinafter. It can be seen that the anchoring portion 44 has an outer surface 56 which is generally flush with the edges of walls 36 and 38.

A pivotal clamp or locking member 60 is attached by a bolt 62 and self locking nut and washer to fixed member 32. Locking or clamping member 60 includes an upstanding mounting section 64 of approximately the same width as the channel of member 32 for receiving bolt 62. Member 60 is essentially an elongated member of the same length as member 32 with a main body portion 65 with a series of holes 66 for receiving a harness shackle 68 shown in FIG. 3 in dash-dot lines. The series of holes in predetermined spaced relationship allow the flyer's harness to be suspended in order to best cooperate with the center of gravity. The forward end of member 60 has a nose section 70 also of about the same width as the channel of member 32 to be received in the forward part of the channel of member 32. The function of nose portion 70 will be more fully explained hereinafter. As can be seen member 60 defines a locking section 72 which extends approximately from the rearward pivot section 64 to close proximity to nose portion 70. Locking portion 72 is as wide as fixed member 32 and when in locked position as shown in FIG. 4 is approximately co-planar with the edge surfaces of walls 36 and 38. Fixed member 32 and clamping member 60 have registering or coacting semi-circular depressions 33 and 74 respectively to receive the control bar support member which is generally designated by the number 90. A connector recess 76 is formed into the walls 36 and 38 of member 32 and extends from cable anchoring section 44 to near the forward end of locking section 72. A removable pin 78 is received in aligned locking holes 80 in clamp 60 and 82 in member 32 to hold the two sections together in their operative relationship.

The control bar support piece 90 has center section 92 which is received in the coacting depressions 33 and 74. Member 90 is also provided with enlarged end sections 94 defining off-set surfaces 96 which prevent the member 90 from sliding or moving when it is in its locked position. Each of the enlarged end sections 94 includes vertical slot 98 for receiving coacting tongue members 100 at the upper end of down tubes 26. The end portions 94 and tongues 100 are pivotally supported by aircraft type bolts 102.

The cross tube connector generally designated by the number 110 is essentially a flat piece of approximately the same thickness as the recesses 76 in the fixed member 32. Connector 110 has a forward slot 112 and a rear slot 114 of approximately the same width as fixed member 32. In this way, connector 110 slips into recesses 76 and has projecting on each side thereof arms 116 with holes 118. Cross tube receivers generally designated by the number 120 include a pair of spaced apart bracket members 122 with holes therein to align with hole 118 in the connector itself. An aircraft type bolt 124 secures the receive to connector 110. Receiver 120 has a round head portion 126 on which bracket members 122 are formed and extending outwardly from head 126 is tube insert portion 128. Cross tubes 16 being tensioned inwardly from the outer end of the hang glider frame and bolted or riveted over the insert section 128 against the head portion 126. Bolts 124 permit pivotal movement of the receivers 120 upon folding and unfolding of the hang glider frame assembly.

As best seen in FIGS. 3 through 5, a guide cable 130 is anchored as at 132 in an appropriate cavity in anchoring section 44. The guide cable extends through a bushing section 115 on the upper side of connector 110. An opening 134 with a bushing is provided through which the guide cable 130 extends to the front end of the keel. The opening and bushing 134 of are of such a size that the connector 110 readily slides on the guide cable. In this manner when the unit is unclamped as in FIG. 5 the connector readily slides forward so that the cross tubes 16 will fold back on the keel together with the leading edges. When the camel is unclamped as in FIG. 5 guide cable 130 will have some slack therein. When it is in locked position as shown in FIGS. 3 and 4, nose portion 70 of the member 60 engages the guide cable in such a way as to tension the cable by forcing it into cable groove 54.

It will be appreciated that by releasing one king post cable, the removal of pin 78 and the removal of one pin in the control bar to detach the cross bar, the hang glider will fold up for easy transport. With this arrangement it is not necessary each time to tension cables and fuss with wing nuts or other types of threaded connectors.

What is claimed is:

1. Frame adapter for rapid unfolding and folding up of a hang glider frame, comprising:
    a. a stationary member for being secured to a keel member of said hang glider frame,
    b. a clamp member pivotally secured to said stationary member, said stationary member and clamp member being releasably locked together in an operative relationship,
    c. a control bar support member adapted to be held between said clamp member and said stationary member when said clamp member and said stationary member are in an operative mode,
    d. a cross tube connector member adapted to be held between said clamp and stationary members when in said operative mode, and
    e. guide cable means, one end of said guide cable means being secured to said stationary member and extending through said connector member and being secured to the forward end of said keel member.

2. The frame adapter according to claim 1 and in which said stationary member is an elongated, generally U-shaped member having a front end and a rear end, said guide cable means consisting of a guide cable, and wherein an anchoring portion for said guide cable is located between said control bar support member and said cross tube connector member.

3. The frame adapter according to claim 2 and in which said guide cable is located and extends generally centrally and longitudinally of said stationary member and out the front end such that said front end is provided with a cable guide groove means.

4. The frame adapter according to claim 3 and wherein the clamp member has a front enlarged nose end extending into the forward end of said stationary member in the operative mode whereby slack is removed in said cable and tension lightly exerted thereon by the nose end of said clamp member being in a locked position.

5. The frame adapter according to claim 4 and in which said cross tube connector member is essentially a flat plate on the upper side of which is a cable guide passage through which said cable extends and as a result of which said cross tube connector member slides forwardly when the glider frame is folded up and which slides rearwardly to the adapter when the glider frame is unfolded.

6. The frame adapter according to claim 5 and in which the rear end of said clamp member includes a pivot section which extends into the rear end of said stationary member and through which a pivot means is received in aligned holes in said pivot section and the rear end of said stationary member.

7. The frame adapter according to claim 6 and in which coacting recesses are formed in said stationary and clamp members for receiving said control bar support member and said recesses are formed so that lateral movement of the control bar support member is prevented.

* * * * *